(12) United States Patent
Wang

(10) Patent No.: US 8,529,243 B1
(45) Date of Patent: Sep. 10, 2013

(54) MOLD HAVING ADJUSTABLE CAVITY DEPTH

(75) Inventor: Jia-Ming Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/600,246

(22) Filed: Aug. 31, 2012

(30) Foreign Application Priority Data

May 29, 2012 (TW) .............................. 101119223 A

(51) Int. Cl.
*B29C 33/00* (2006.01)
(52) U.S. Cl.
USPC ............ 425/408; 425/195; 425/555; 249/155
(58) Field of Classification Search
USPC .................. 425/DIG. 10, 195, 555; 249/102, 249/124, 155, 156
See application file for complete search history.

(56) References Cited

U.S. PATENT DOCUMENTS

| | | | | |
|---|---|---|---|---|
| 705,972 A | * | 7/1902 | Steele | 249/54 |
| 1,950,872 A | * | 3/1934 | Whiteley | 249/54 |
| 2,813,301 A | * | 11/1957 | Underwood | 425/466 |
| 5,676,979 A | * | 10/1997 | Folsom et al. | 425/13 |
| 5,849,344 A | * | 12/1998 | Eto et al. | 425/556 |

FOREIGN PATENT DOCUMENTS

| | | | |
|---|---|---|---|
| JP | 57-8105 | * | 1/1982 |
| JP | 61-95915 | * | 5/1986 |
| JP | H09-141682 | * | 6/1997 |

* cited by examiner

*Primary Examiner* — Joseph S Del Sole
*Assistant Examiner* — Kimberly A Stewart
(74) *Attorney, Agent, or Firm* — Altis Law Group, Inc.

(57) ABSTRACT

A mold includes a bottom die and an upper die. The bottom die defines a bottom cavity and includes a bottom parting surface. The upper die defines an upper cavity and includes an upper parting surface. The bottom cavity and the upper cavity cooperatively form a mold cavity, and at least one of the bottom parting surface and the upper parting surface defines receiving grooves. The mold further includes a block and a spacer. The spacer is received in a specific one of the receiving grooves. The block is detachably fixed in the specific receiving groove and holds the spacer in the specific receiving groove. The block protrudes out of the specific receiving groove.

6 Claims, 4 Drawing Sheets

MOLD HAVING ADJUSTABLE CAVITY DEPTH

BACKGROUND

1. Technical Field

The present disclosure relates to molds and, particularly, to a mold with adjustable cavity depth.

2. Description of Related Art

Before molding, a mold needs to be tested. In the process of testing, the depth of the molding cavity of the mold may need to be modified. Currently, there is no quick or simple method of modifying the mold.

Therefore, a mold having an adjustable cavity depth which can overcome the above-mentioned problems is needed.

BRIEF DESCRIPTION OF THE DRAWINGS

FIGS. 3 and 4 are sectional views taking along line of FIG. 1, wherein FIGS. 3 and 4 show the mold having different cavity depths.

DETAILED DESCRIPTION

Figure 1:
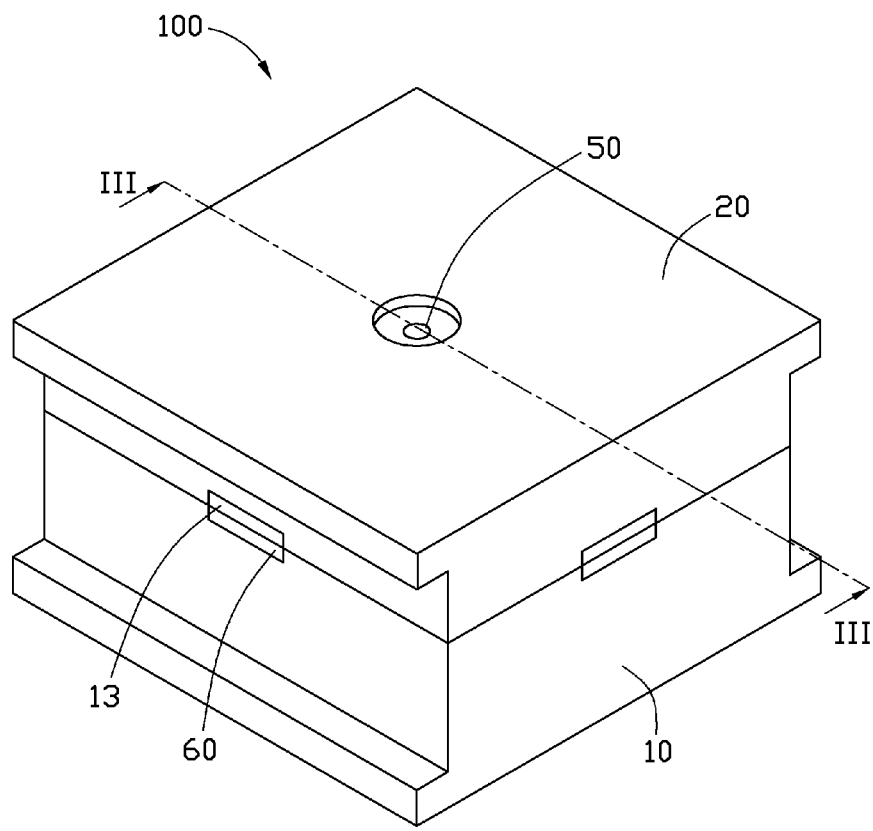
FIG. 1 is a schematic, isometric view of a mold according to an exemplary embodiment.
Figure 2:
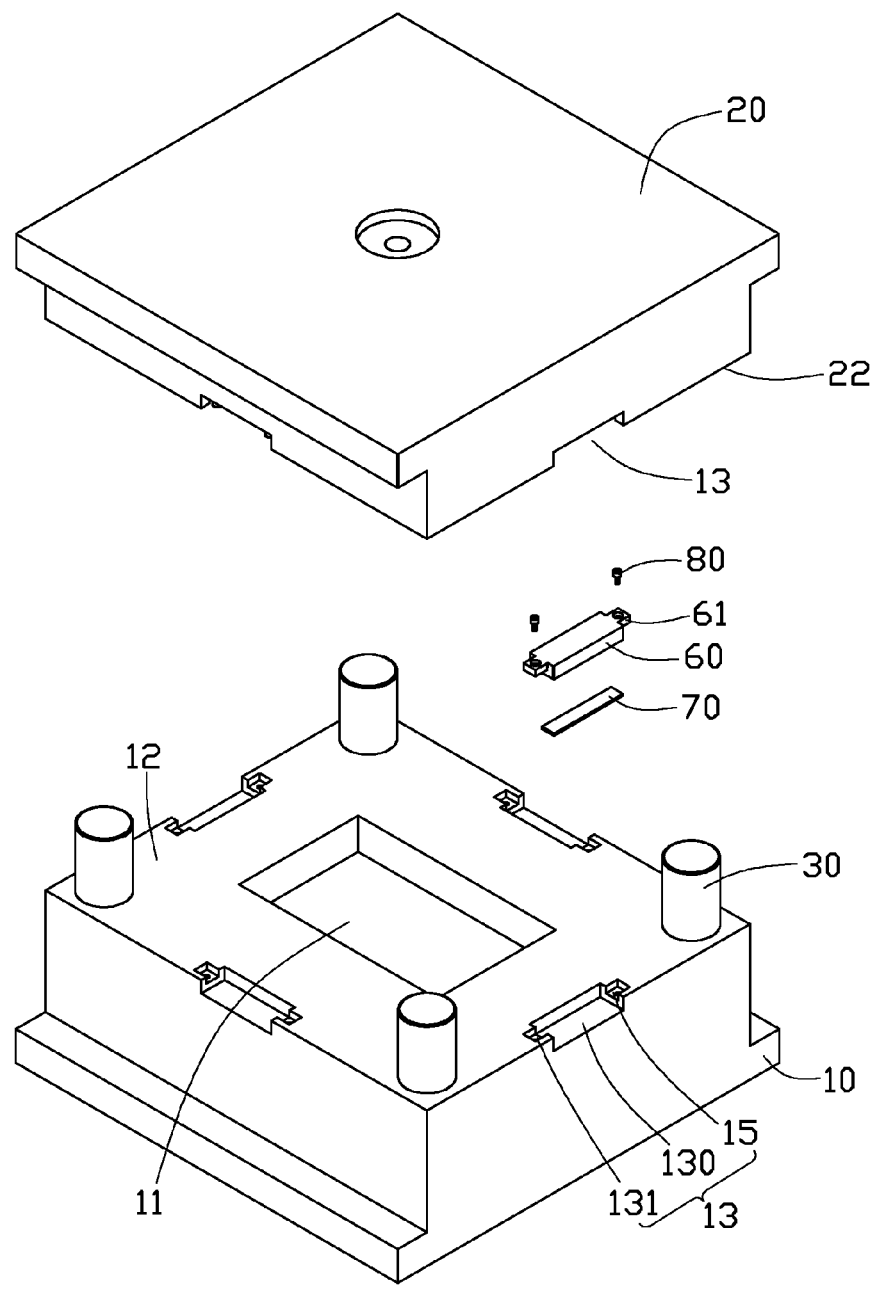
FIG. 2 is an exploded view of the mold of FIG. 1.
Figure 3:
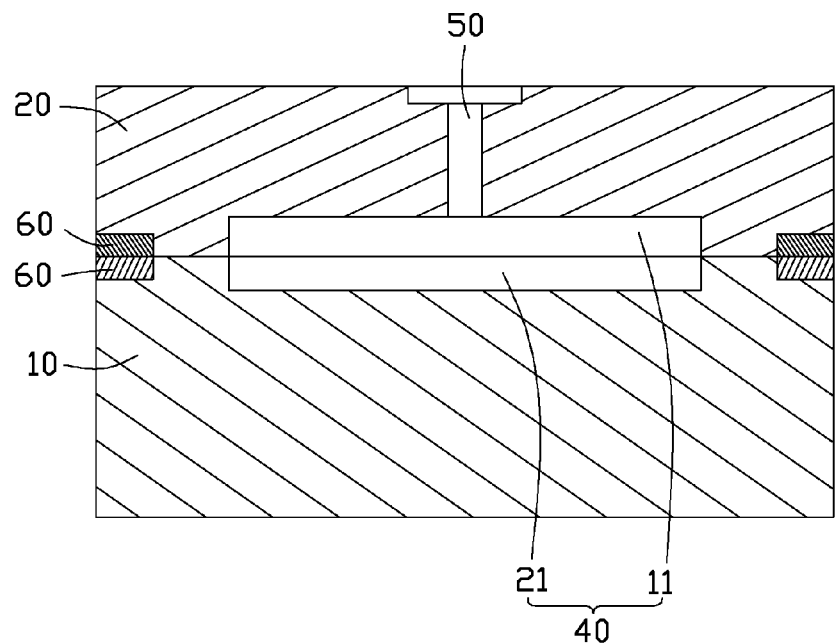
Figure 4:
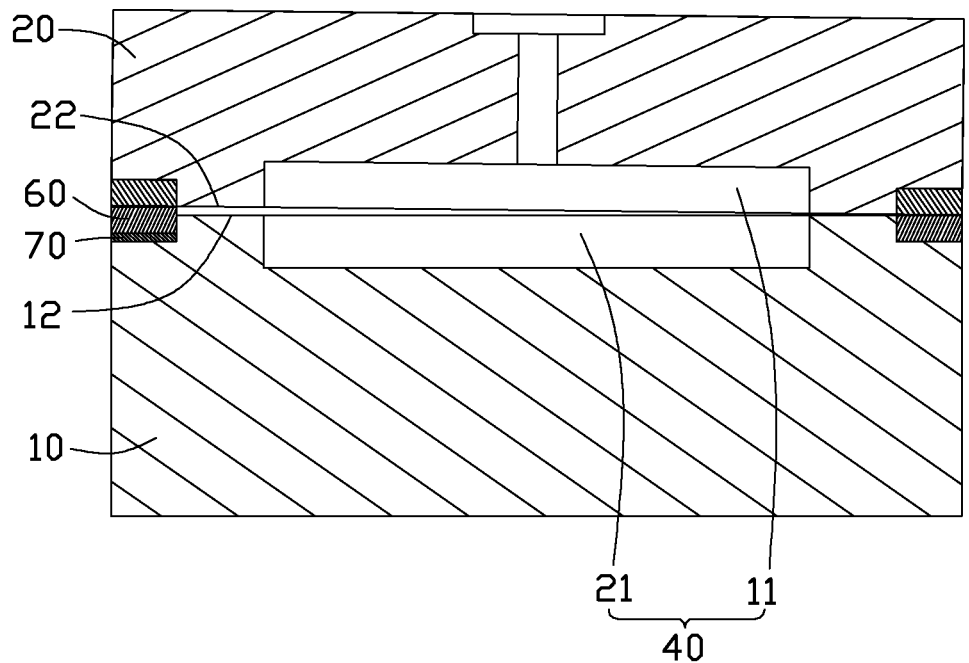

Referring to FIGS. 1 to 4, a mold 100 according to an exemplary embodiment is shown. The mold 100 includes a bottom die 10, an upper die 20, and positioning posts 30 fixed on the bottom die 10. The upper die 20 defines holes (not shown) for slideably receiving the positioning posts 30. The upper die 20 and the bottom die 10 can be closed or opened by moving the dies 20, 30 along the positioning posts 30.

The bottom die 10 defines a bottom cavity 11, and includes a bottom parting surface 12. The upper die 20 defines an upper cavity 21, and includes an upper parting surface 22. When the mold 100 is closed, the upper parting surface 22 and the bottom parting surface 12 are in contact with each other, and the upper cavity 21 and the bottom cavity 11 cooperatively form a molding cavity 40.

The mold 100 further includes a gate 50 and runners (not shown) for introducing melted material into the molding cavity 40. In this embodiment, the gate 50 is positioned at the upper die 20.

The upper parting surface 22 and the bottom parting surface 12 both define a number of spaced receiving grooves 13 at edges of the surfaces 12, 22. In this embodiment, the upper parting surface 22 and the bottom parting surface 12 are square, and one of the receiving grooves 13 is defined at each side of the upper parting surface 22 and the bottom parting surface 12.

Each of the receiving grooves 13 is substantially strip-shaped, and includes a main portion 130 and two locking portions 131 at two opposite ends of the main portion 130. The locking portions 131 are communicated with the main portion 130. A threaded hole 15 is defined in each of the locking portions 131.

The mold 100 further includes a number of blocks 60 and a number of spacers 70. The shape and size of the blocks 60 are consistent with the receiving grooves 13. The blocks 60 define locking holes 61 corresponding to the threaded holes 15. The spacers 70 are about 0.01 millimeters (mm) thick.

In assembly, the blocks 60 are fixed in the receiving grooves 13 by extending screws 80 through the locking holes 61 and screwing the screws 80 into the corresponding threaded holes 15. As the shape and size of the blocks 60 are consistent with the receiving grooves 13, and no spacers 70 have been installed yet, the blocks 60 will not protrude from the bottom parting surface 12 and the upper parting surface 22. When the mold 100 is closed, the bottom parting surface 12 is in full contact with the upper parting surface 22.

When the depth of one or more parts of the molding cavity 40 needs to be increased, the corresponding block or blocks 60 is loosened, and one or more spacers 70 are inserted into the main portion 130 according to the needed increased depth, then the block 60 is tightened again trapping the spacer or spaces 70. In this way, the block or blocks 60 corresponding to where increased depth of the mold 100 is needed extend beyond the corresponding parting surface.

In the present disclosure, spacers 70 can be added to selectively increase depths of the molding cavity 40. There is no need to remake or replace the mold 100, thus, the time and cost for testing and obtaining the desired mold configuration are reduced.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A mold, comprising:
   a bottom die defining a bottom cavity and comprising a bottom parting surface;
   an upper die defining an upper cavity and comprising a upper parting surface, wherein the bottom cavity and the upper cavity cooperatively form a mold cavity, and at least one of the bottom parting surface and the upper parting surface defines receiving grooves;
   a spacer fully received in a specific one of the receiving grooves; and
   a block detachably fixed in the specific receiving groove and holding the spacer in the specific receiving groove, the block protruding out of the specific receiving groove; wherein
   the spacer and the block are arranged in a line in a direction perpendicular to the bottom parting surface or the upper parting surface.

2. The mold of claim 1, wherein both the bottom parting surface and the upper parting surface define the receiving grooves.

3. The mold of claim 2, wherein the bottom parting surface and the upper parting surface are substantially square, and the receiving grooves are positioned at each side of the bottom parting surface and the upper parting surface.

4. The mold of claim 1, wherein the shape and size of the block is consistent with that of the receiving grooves.

5. The mold of claim 1, wherein each of the receiving grooves comprises a main portion and two locking portions at two opposite ends of the main portion, the locking portions are communicated with the main portion.

6. The mold of claim 5, wherein each of the locking portions defines a threaded hole, the block defines locking holes corresponding to threaded holes of the locking portions, and the mold further comprises screws extending through the locking holes and engaged in the threaded holes to fix the block in the specific receiving groove.

* * * * *